(12) United States Patent
Buono et al.

(10) Patent No.: US 9,835,442 B2
(45) Date of Patent: Dec. 5, 2017

(54) METHODS FOR DETERMINING A SHAPE OF A SUBSTANTIALLY CYLINDRICAL SPECULAR REFLECTIVE SURFACE

(71) Applicant: Corning Incorporated, Corning, NY (US)

(72) Inventors: Joseph Richard Buono, Painted Post, NY (US); Sergey Y Potapenko, Painted Post, NY (US); Nicholas Leon Susch, Painted Post, NY (US); Dale Alan Webb, Corning, NY (US)

(73) Assignee: Corning Incorporated, Corning, NY (US)

( * ) Notice: Subject to any disclaimer, the term of this patent is extended or adjusted under 35 U.S.C. 154(b) by 32 days.

(21) Appl. No.: 15/037,178

(22) PCT Filed: Nov. 13, 2014

(86) PCT No.: PCT/US2014/065399
§ 371 (c)(1),
(2) Date: May 17, 2016

(87) PCT Pub. No.: WO2015/077113
PCT Pub. Date: May 28, 2015

(65) Prior Publication Data
US 2016/0290791 A1    Oct. 6, 2016

Related U.S. Application Data

(60) Provisional application No. 61/908,277, filed on Nov. 25, 2013.

(51) Int. Cl.
*G01B 11/24* (2006.01)
*C03B 17/06* (2006.01)
(Continued)

(52) U.S. Cl.
CPC ............ *G01B 11/24* (2013.01); *C03B 17/064* (2013.01); *G01B 11/25* (2013.01); *G06K 9/4604* (2013.01); *G06K 9/4661* (2013.01)

(58) Field of Classification Search
CPC ....... C03B 17/064; G01B 11/25; G01B 11/24; G06K 9/4661; G06K 9/4604
See application file for complete search history.

(56) References Cited

U.S. PATENT DOCUMENTS 5,753,931 A    5/1998    Borchers et al.
6,556,783 B1    4/2003    Gelphman
(Continued)

FOREIGN PATENT DOCUMENTS

WO    2007015772 A2    2/2007
WO    2009070262 A1    6/2009

OTHER PUBLICATIONS

E. Jacobsen and P. Kootsookos, "Fast, accurate frequency estimators," IEEE Signal Process. Mag., vol. 24, pp. 123-125, May 2007.
(Continued)

*Primary Examiner* — Edward Park
(74) *Attorney, Agent, or Firm* — Kevin M. Able

(57) ABSTRACT

A method for determining a shape of a substantially cylindrical specular reflective surface includes the step of obtaining calibration data and the step of obtaining target data about a target structure. The method further includes the step of defining a target line from the target data, where the target line represents a feature of the target structure and the step of capturing a reflected image of the target structure in the specular reflective surface. The method further includes the step of obtaining reflected data from the reflected image and the step of defining a reflected line from the reflected data, where the reflected line represents a reflection of the feature of the target structure. The method also includes the step of determining a correspondence between the target line and
(Continued)

the reflected line and using the correspondence and the calibration data to determine the shape of the specular reflective surface.

20 Claims, 11 Drawing Sheets

(51) Int. Cl.
  *G01B 11/25* (2006.01)
  *G06K 9/46* (2006.01)

(56) References Cited

U.S. PATENT DOCUMENTS

| | | | |
|---|---|---|---|
| 6,590,669 | B1 | 7/2003 | Wagner |
| 6,690,474 | B1 | 2/2004 | Shirley |
| 6,741,363 | B1 * | 5/2004 | Kaupert ............... G01B 11/25 250/559.23 |
| 7,075,662 | B2 | 7/2006 | Hallerman et al. |
| 7,532,333 | B2 | 5/2009 | Haeusler et al. |
| 7,710,558 | B2 | 5/2010 | Wornson et al. |
| 7,920,257 | B2 | 4/2011 | An et al. |
| 8,208,719 | B2 * | 6/2012 | Gordon ............... G01B 11/2513 382/154 |
| 8,284,392 | B2 | 10/2012 | Lampalzer |
| 8,441,532 | B2 | 5/2013 | Potapenko |
| 2005/0238237 | A1 | 10/2005 | Haeusler et al. |
| 2007/0140311 | A1 | 6/2007 | House et al. |
| 2009/0257052 | A1 | 10/2009 | Surrel |
| 2010/0214406 | A1 | 8/2010 | Potapenko |
| 2010/0315422 | A1 | 12/2010 | Andre et al. |
| 2012/0300065 | A1 | 11/2012 | Willemann et al. |
| 2013/0010175 | A1 | 1/2013 | Pichon et al. |
| 2013/0098109 | A1 | 4/2013 | Ohto |

OTHER PUBLICATIONS

M. Knauer, J. Kaminski, and G. Häusler, "Phase Measuring Deflectometry: a new approach to measure specular free-form surfaces," Optical Metrology in Production Engineering, Proc. SPIE 5457, pp. 366-376, Apr. 2004.

Korean Intellectual Property Office; International Search Report and Written Opinion of International Application No. PCT/US2014/065399; dated Feb. 16, 2015; pp. 1-10.

* cited by examiner

METHODS FOR DETERMINING A SHAPE OF A SUBSTANTIALLY CYLINDRICAL SPECULAR REFLECTIVE SURFACE

PRIORITY

This application claims the benefit of priority under 35 U.S.C. §119 of U.S. Provisional Application Ser. No. 61/908,277 filed on Nov. 25, 2013, the content of which is relied upon and incorporated herein by reference in its entirety.

TECHNICAL FIELD

The present invention relates generally to methods for determining a shape, and more particularly, to methods for determining a shape of a substantially cylindrical specular reflective surface.

BACKGROUND

Glass manufacturing apparatus are commonly used to form glass ribbon that may be separated into glass sheets. In some applications, there may be a desire to determine a shape associated with a glass ribbon, a glass sheet, or other glass element.

SUMMARY

The following presents a simplified summary of the disclosure in order to provide a basic understanding of some example aspects described in the detailed description.

In a first aspect of the disclosure, a method for determining a shape of a substantially cylindrical specular reflective surface comprises the step (I) of obtaining calibration data and the step (II) of obtaining target data about a target structure. The method further includes the step (III) of defining a target line from the target data, wherein the target line represents a feature of the target structure and the step (IV) of capturing a reflected image of the target structure in the specular reflective surface. The method further includes the step (V) of obtaining reflected data from the reflected image and the step (VI) of defining a reflected line from the reflected data, wherein the reflected line represents a reflection of the feature of the target structure. The method also includes the step (VII) of determining a correspondence between the target line and the reflected line and the step (VIII) of using the correspondence and the calibration data to determine the shape of the specular reflective surface.

In one example of the first aspect, step (VIII) comprises performing a shape recovery algorithm.

In another example of the first aspect, step (III) comprises performing a regression analysis with respect to a plurality of data points from the target data wherein the plurality of data points is related to the feature of the target structure.

In still another example of the first aspect, step (VI) comprises performing a regression analysis with respect to a plurality of data points from the reflected data, wherein the plurality of data points is related to the reflection of the feature of the target structure.

In still another example of the first aspect, the feature of the target structure is an edge of the target structure.

In still another example of the first aspect, the specular reflective surface extends along a plane and the feature of the target structure is substantially parallel to the plane.

In still another example of the first aspect, the specular reflective surface extends along a plane and the feature of the target structure is substantially perpendicular to the plane.

In still another example of the first aspect, the specular reflective surface comprises a major surface of a sheet of material.

In still another example of the first aspect, the shape approximates a cross-profile of the specular reflective surface.

In still another example of the first aspect, the method further comprises the step of determining a plurality of shapes of the specular reflective surface, wherein each shape approximates a cross-profile of the specular reflective surface. For example, the method further comprises the step of approximating a surface profile of the specular reflective surface based on the plurality of shapes The first aspect may be provided alone or in combination with one or any combination of the examples of the first aspect discussed above.

In a second aspect of the disclosure a method of determining a shape of a glass ribbon drawn from a quantity of molten glass comprises the step (I) of obtaining calibration data and the step (II) of obtaining target data about a target structure. The method further includes the step (III) of defining a target line from the target data, wherein the target line represents a feature of the target structure and the step (IV) of capturing a reflected image of the target structure in the glass ribbon. The method further includes the step (V) of obtaining reflected data from the reflected image and the step (VI) of defining a reflected line from the reflected data, wherein the reflected line represents a reflection of the feature of the target structure. The method also includes the step (VII) of determining a correspondence between the target line and the reflected line and the step (VIII) of using the correspondence and the calibration data to determine the shape of the glass ribbon.

In one example of the second aspect, step (VIII) comprises performing a shape recovery algorithm.

In another example of the second aspect, step (III) comprises performing a regression analysis with respect to a plurality of data points from the target data, wherein the plurality of data points is related to the feature of the target structure.

In still another example of the second aspect, step (VI) comprises performing a regression analysis with respect to a plurality of data points from the reflected data, wherein the plurality of data points is related to the reflection of the feature of the target structure.

In still another example of the second aspect, the glass ribbon is continuously moving in a draw direction.

In still another example of the second aspect, the shape is used to control up-stream parameters of a glass forming process.

In still another example of the second aspect, the shape is used to control parameters of a down-stream process.

In still another example of the second aspect, the shape is used to control up-stream parameters of a glass forming process and parameters of a down-stream process.

In still another example of the second aspect, the shape is used to determine an attribute of the glass ribbon, and wherein a quality of the glass ribbon is categorized based on the attribute.

The second aspect may be provided alone or in combination with one or any combination of the examples of the second aspect discussed above.

BRIEF DESCRIPTION OF THE DRAWINGS

These and other aspects are better understood when the following detailed description is read with reference to the accompanying drawings, in which.

DETAILED DESCRIPTION

Figure 1:
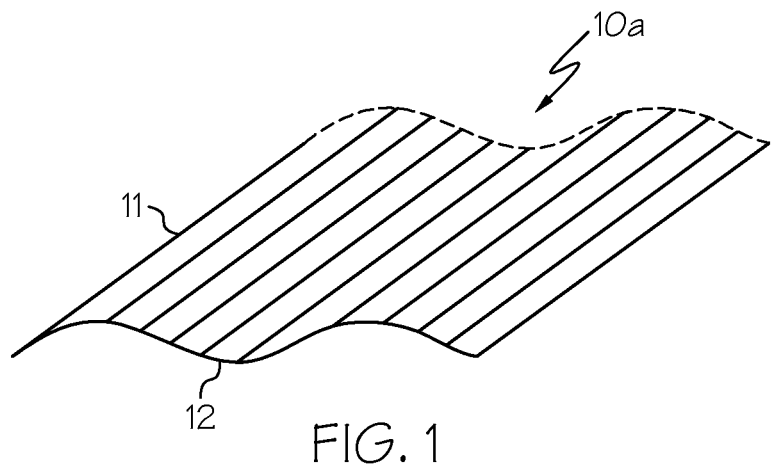
FIG. 1 illustrates an example cylindrical surface.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Aspects of the disclosure include methods for determining a shape, and more particularly, methods for determining a shape of a substantially cylindrical specular reflective surface. A specular reflective surface may exhibit characteristics wherein an incoming beam of light is reflected at the same angle with respect to the surface normal. For example, the angle of incidence equals the angle of reflection. Further, the incident beam, the reflected beam, and the surface normal can all lie within the same plane. The principles of deflectometry, and more particularly reflectometry, can be used to determine a shape of a specular reflective surface from distortion or a shape of a specular reflective surface from specular reflection. For example, given a structure of known geometry, one can use a distorted reflection of that structure in a specular reflective surface to deduce the geometric properties of the specular reflective surface which produced the distorted reflection. The reflection of the structure can be distorted for a variety of reasons, including due to curvature, defects, anomalies, or irregularities in the surface. By analyzing the reflection and, for example, determining a correspondence between a feature of the structure of known geometry and a corresponding reflection of the feature of the structure of known geometry in the specular reflective surface, one can back-calculate or recover a shape of the surface that follows from the correspondence. This shape can be used for any number of applications, controls, or calculations such as, for example, to simulate or approximate a three-dimensional profile of the actual specular reflective surface.

Figure 2:
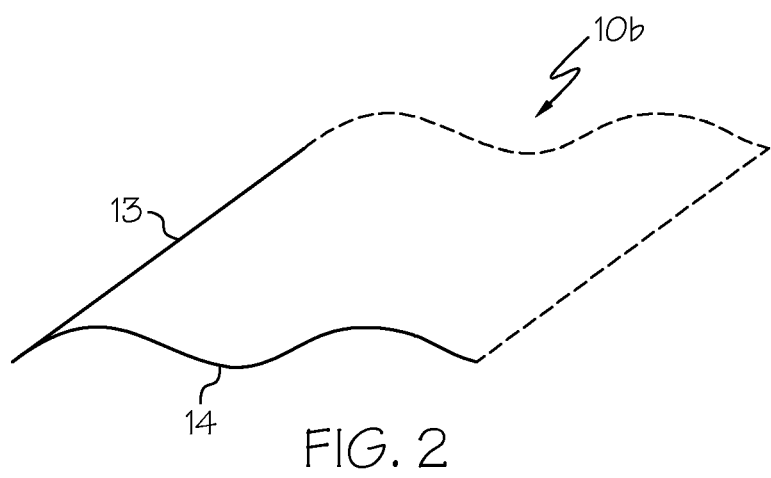
FIG. 2 illustrates another example cylindrical surface.
Figure 3:
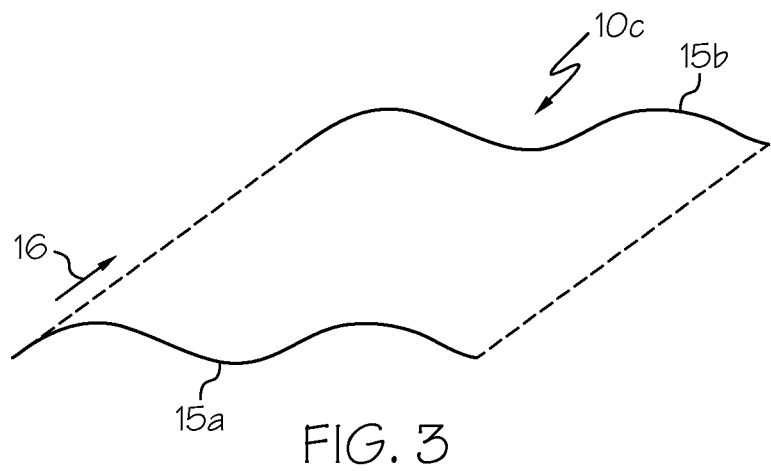
FIG. 3 illustrates yet another example cylindrical surface.

FIGS. 1-3 illustrate examples of a cylindrical surface. FIG. 1 illustrates an example cylindrical surface 10a defined by a series of parallel lines 11 passing through a curve 12. FIG. 2 illustrates another example cylindrical surface 10b which can be defined by moving a straight line 13 along a curve known as a directrix 14. In still another example, FIG. 3 illustrates a cylindrical surface 10c which can be defined by projecting a beginning directrix 15a in a direction 16 such that the beginning directrix 15a is parallel to an ending directrix 15b. The method provided herein can be used to determine a shape of a substantially cylindrical specular reflective surface. For example, a shape of a surface which satisfies or which deviates slightly from the mathematical or theoretical characterization of a cylindrical surface can be determined. In one example, the substantially cylindrical specular reflective surface can comprise a major surface of a ribbon of material or a sheet of material such as a sheet of material divided from a ribbon of material. For instance, the substantially cylindrical specular reflective surface can comprise a major surface of a ribbon of glass or a sheet of glass, such as a sheet of glass divided from a ribbon of glass. In further examples, the substantially cylindrical specular reflective surface may comprise an outer peripheral surface of an optical fiber or other object.

Where an object comprises a substantially cylindrical specular reflective surface, the method can be used to determine the shape of the substantially cylindrical specular reflective surface as well as the shape of the object having the substantially cylindrical specular reflective surface. For explanatory purposes, hereinafter, when referring to a substantially cylindrical specular reflective surface, it is to be understood that such surface could exist as an isolated surface or could exist as the surface of an object. The method provided herein can, as noted, be used to determine a shape of such surface and/or a shape of an object having such surface.

The method includes the step of obtaining calibration data. The calibration data can be obtained in a variety of manners, including directly or indirectly coding data into a computer, using a detection device to observe data, using a sensor to measure data, or capturing an image containing data from which the calibration data can be extracted. Examples of calibration data include coordinates or other information representing a characteristic or characteristics of any of the systems, components, or structures used in or by the method. For example, calibration data can include a spatial location of components of the system, such as the spatial location of a camera, a lens, or a focal point, information about the specular reflective surface, the target structure and its associated features, or any other parameters, initial conditions, or data associated therewith. In another example, the calibration data can include reference points or coordinates which can be used to determine and define spatial locations or relationships between various system components, structures, and variables. The calibration data can, for instance, be transformed, via a transformation matrix or other mathematical calculation, from three-dimensional coordinates in real space into two-dimensional coordinates. In still a further example, calibration data can be manipulated, combined, analyzed, or processed for further analysis, manipulation and/or calculations to be performed thereon.

The method further includes the step of obtaining target data about a target structure. The target data can be obtained in a variety of manners, including directly or indirectly coding data into a computer, using a detection device to observe data, using a sensor to measure data, or capturing an image containing data from which the target data can be extracted. Examples of target data include coordinates representing a spatial location or other reference characteristics relating to the target structure and/or its associated features, as well as any other information involving the target structure. For instance, the target data can include reference points which can be used to define and determine any number of a characteristic or relationship between the target structure and/or its associated features and various system components, structures, and variables. Still further, these reference points can be transformed, via a transformation matrix or other mathematical calculation, from three-dimensional coordinates in real space to two-dimensional coordinates. In still a further example, target data can be manipulated, combined, analyzed, or processed for further analysis, manipulation and/or calculations to be performed thereon.

Figure 4:
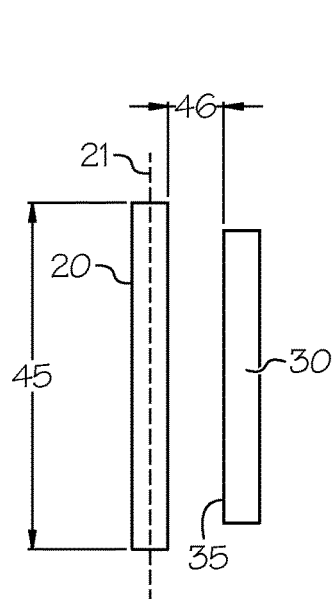
FIG. 4 illustrates a top view of an example configuration wherein a feature of the target structure is substantially parallel to the specular reflective surface.
Figure 5:
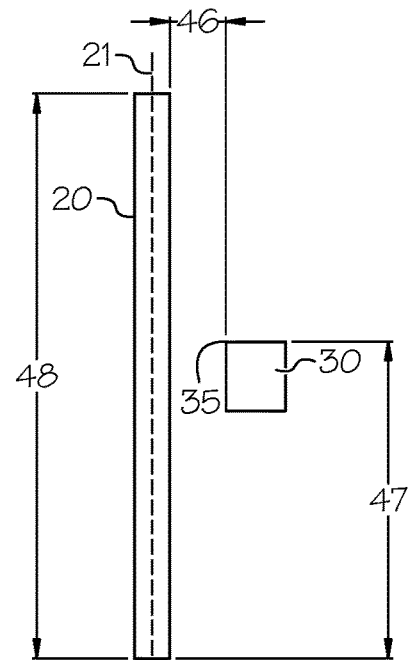
FIG. 5 illustrates a side view of the configuration of FIG. 4.
Figure 6:
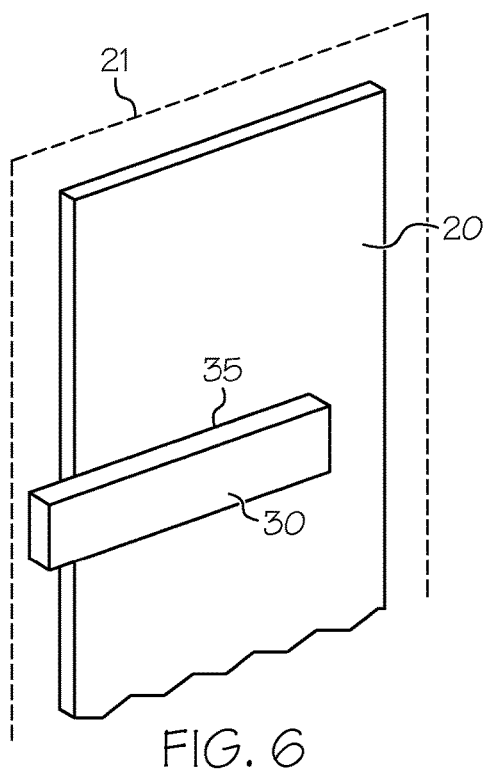
FIG. 6 illustrates a perspective view of the configuration of FIG. 4.
Figure 7:
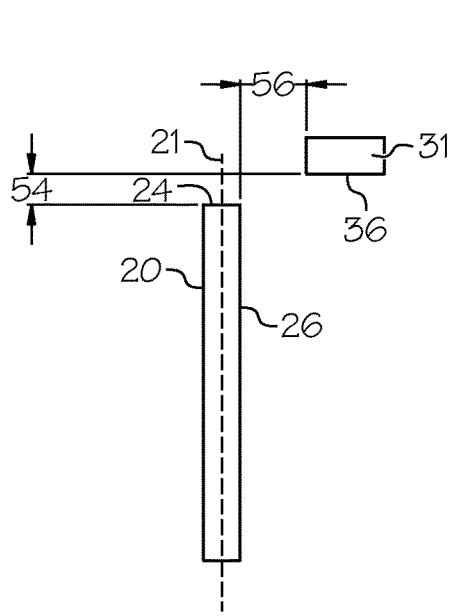
FIG. 7 illustrates a top view of another example configuration wherein a feature of the target structure is substantially perpendicular to the specular reflective surface.
Figure 8:
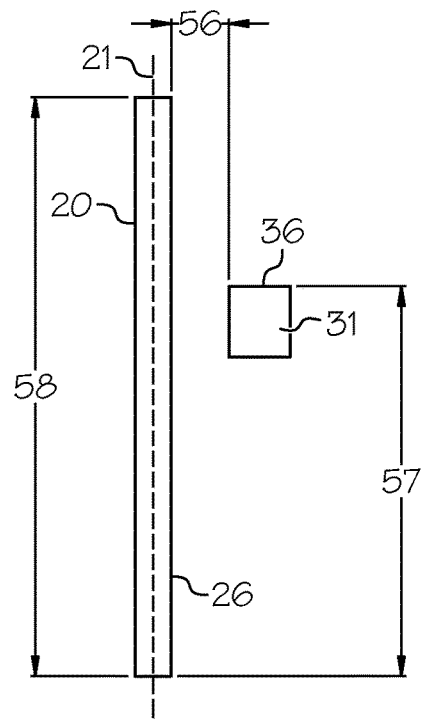
FIG. 8 illustrates a side view of the configuration of FIG. 7.
Figure 9:
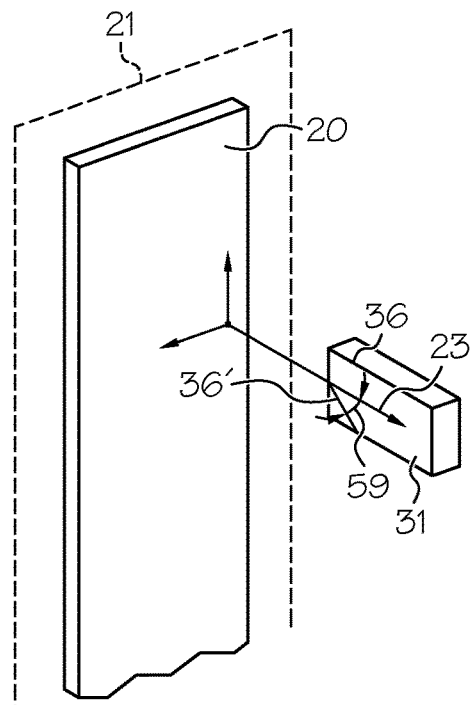
FIG. 9 illustrates a perspective view of the configuration of FIG. 7.

As shown in FIGS. 4-6, a specular reflective surface 20 can extend along a plane 21 and a feature 35 of a target structure 30 can be substantially parallel to the plane 21. In another example, as shown in FIGS. 7-9, the specular reflective surface 20 can extend along a plane 21 and a feature 36 of a target structure 31 can be substantially perpendicular to the plane 21. A target structure 30, 31 can comprise any of a one or a plurality of geometries, shapes, structures, or sizes, including any of a plurality of features or characteristics associated therewith. The target structure can be constructed from any of a variety of materials. In one example, the target structure can be constructed from a material or materials having desirable properties for use in various environments. In further examples, the target structure can be independently lighted or dependently lighted by a light source. In still further examples, the target structure can be dynamic in that, for example, the structure can include features or characteristics which can be changed, manipulated, or controlled either automatically or manually at any instance in time.

In the example shown in FIGS. 4-6, where the feature 35 of the target structure 30 is substantially parallel to the specular reflective surface 20, the feature 35 of the target structure can extend substantially parallel to the specular reflective surface 20 along a width 45 of the specular reflective surface 20 and at a distance 46 from the specular reflective surface 20. The substantially parallel feature 35 of the target structure 30 can also be located at an elevation 47 along a height 48 of the specular reflective surface 20.

As shown in the example of FIGS. 7-9, the feature 36 of the target structure 31 can extend substantially perpendicular to the specular reflective surface 20 at a distance 54 from an edge 24 of the specular reflective surface and at a distance 56 from a face 26 of the specular reflective surface 20. The substantially perpendicular feature 36 of the target structure 31 can also be located at an elevation 57 along a height 58 of the specular reflective surface 20. In still a further example, a substantially perpendicular feature 36' of the target structure 31 can be at an angle 59 relative to a surface normal 23 of the specular reflective surface 20.

Figure 10:
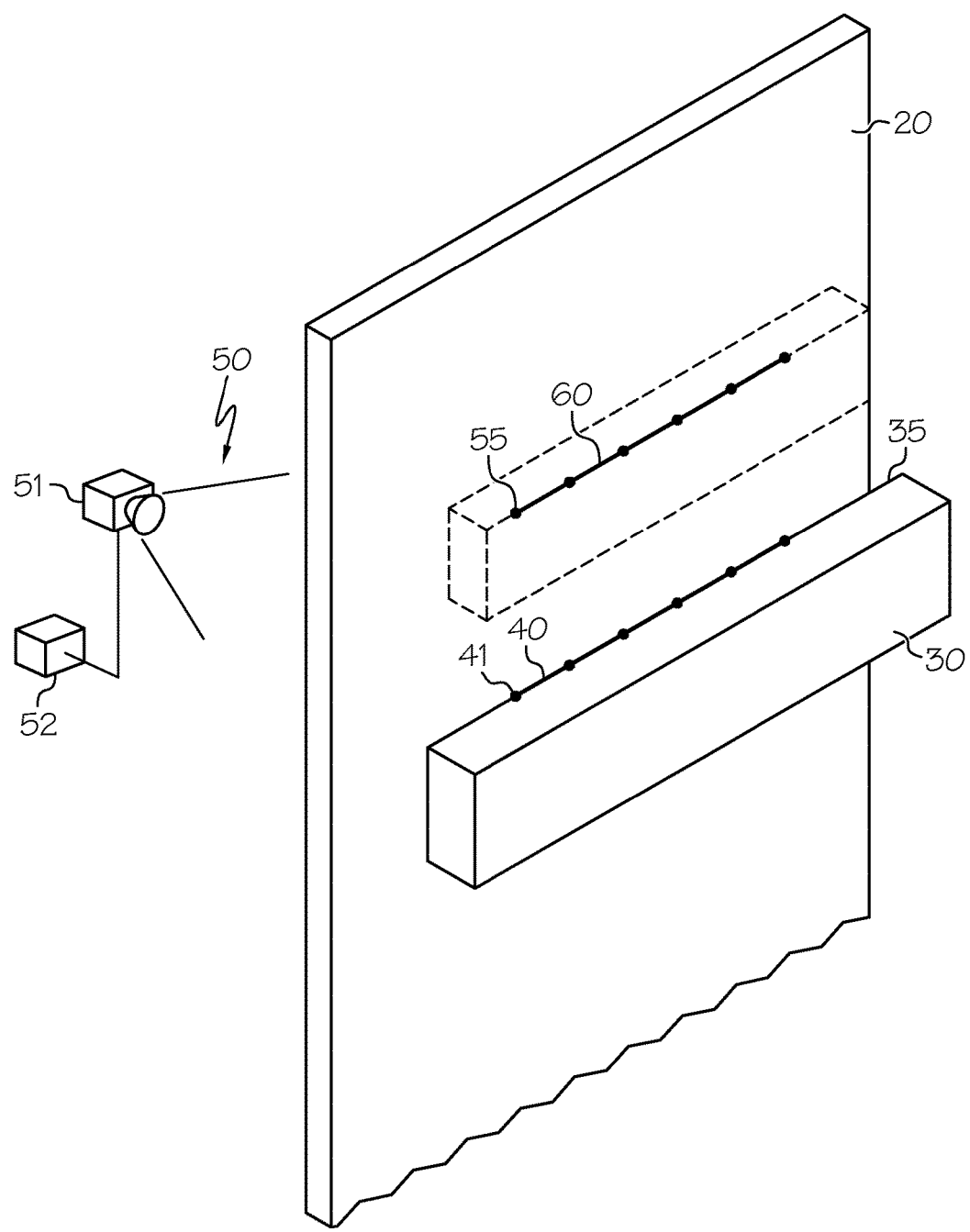
FIG. 10 illustrates an example method including the steps of obtaining target data about a target structure, defining a target line from the target data, capturing a reflected image of the target structure in the specular reflective surface, obtaining reflected data from the reflected image, and defining a reflected line from the reflected data.

As shown in FIG. 10, the method further includes the step of defining a target line 40 from the target data 41, wherein the target line 40 represents the feature 35 of the target structure 30. The feature 35 of the target structure 30 can be any of a feature or characteristic of the target structure 30. In one example, the feature 35 of the target structure can be an edge of the target structure 30. For instance, where the target structure 30 is of a geometric shape, as shown in FIG. 10, the feature 35 of the target structure 30 can be an edge of the geometric shape. The feature 35 of the target structure 30 can exist at any of a location on the target structure and can extend at various angles and/or various directions relative to the specular reflective surface 20.

Known edge finding techniques, for example, can be used to mathematically define data points corresponding to an edge or other features or characteristics of the target structure. Various mathematical techniques are known and may be used to define a target line from the target data. In one example, this step can comprise performing a regression analysis with respect to a plurality of data points from the target data, wherein the plurality of data points can be related to the feature of the target structure. From these data points, a target line can be determined using any of a regression analysis approach or other mathematical technique.

As shown in FIG. 10, the method further includes the step of capturing a reflected image 50 of the target structure 30 in the specular reflective surface 20. The reflected image 50 can be captured using an image capture device 51, including a camera or other image or video recording device. Once captured, the reflected image 50 can be analyzed or transferred to a computer 52 by which data contained within the image can be extracted, processed, and/or analyzed.

As also shown in FIG. 10, the method further includes the step of obtaining reflected data 55 from the reflected image 50. The reflected data 55 can be obtained in a variety of manners, including extracting, processing, and/or analyzing the reflected image 50 to obtain the reflected data 55. Examples of reflected data 55 include coordinates representing a spatial location or other reference characteristics relating to the reflected image 50 of the target structure and/or its associated reflected features, as well as any other information involving the reflected image 50. For instance, the reflected data 55 can include reference points which can be used to define and determine any number of a characteristic or relationship between the reflected image 50 of the target structure and/or its associated reflected features and various system components, structures, and variables. Still further, these reference points can be transformed, via a transformation matrix or other mathematical calculation, from three-dimensional coordinates in real space to two-dimensional coordinates. In still a further example, reflected data 55 can be manipulated, combined, analyzed, or processed for further analysis, manipulation and/or calculations to be performed thereon.

As also shown in FIG. 10, the method further includes the step of defining a reflected line 60 from the reflected data 55, wherein the reflected line 60 represents a reflection of the feature 35 of the target structure 30. As noted, the feature 35 of the target structure 30 can be any of a feature or characteristic of the target structure 30. As such, the reflection of the feature 35 of the target structure 30 can be any of a corresponding reflection of a feature or characteristic of the target structure 30. In one example, as noted, the feature 35 of the target structure 30 can be an edge of the target structure 30. Thus, the reflection of the feature of the target structure can be a corresponding reflection of an edge of the target structure represented by a reflected line 60 defined from the reflected data 55 extracted from the reflected image 50. For instance, where the target structure is of a geometric shape, the feature of the target structure can be an edge of the geometric shape and the reflection of the feature can be a corresponding reflection of an edge of the geometric shape.

Known edge finding techniques, for example, can be used to mathematically define data points corresponding to a reflection of an edge or other features or characteristics of the target structure. Various mathematical techniques are known and may be used to define a reflected line from the reflected data. In one example, this step can comprise performing a regression analysis with respect to a plurality of data points from the reflected data, wherein the plurality of data points can be related to the reflection of the feature of the target structure. From these data points, a reflected line can be determined using any of a regression analysis approach or other mathematical technique.

The method further includes the step of determining a correspondence between the target line 40 and the reflected line 60. A correspondence can include, for example, a comparison, a correlation, or any other of a relationship or relationships between all or part of the target line 40 and all or part of the reflected line 60. For example, the target line 40 can be analyzed. In another example, the reflected line 60 can be analyzed. In still another example the target line 40 and the reflected line 60 can be analyzed. A correspondence can be determined by any of a variety of techniques, including a computerized or manual process, a mathematical calculation, or any other manner of computation. In one example, the correspondence can include a determination of a distortion of the reflected line 60 from the reflected data 55 in the reflected image 50 compared to the target line 40 from the target data 41 of the target structure 30.

The method further includes the step of using the correspondence and the calibration data to determine the shape of the specular reflective surface 20. In an example, all or part of the correspondence can be used. In another example all or part of the calibration data can be used. In still another example, all or part of the correspondence can be used and all or part of the calibration data can be used. This step can comprise, for example, performing a shape recovery algorithm. A shape recovery algorithm can use any of the data to determine a shape of the specular reflective surface 20. For instance, a shape of the specular reflective surface 20 can be determined by restoring, recovering, back-calculating, or otherwise deducing the contour or profile of the specular reflective surface which would produce the captured reflected image 50 of the target structure 30 based on the correspondence and the calibration data.

Figure 11:
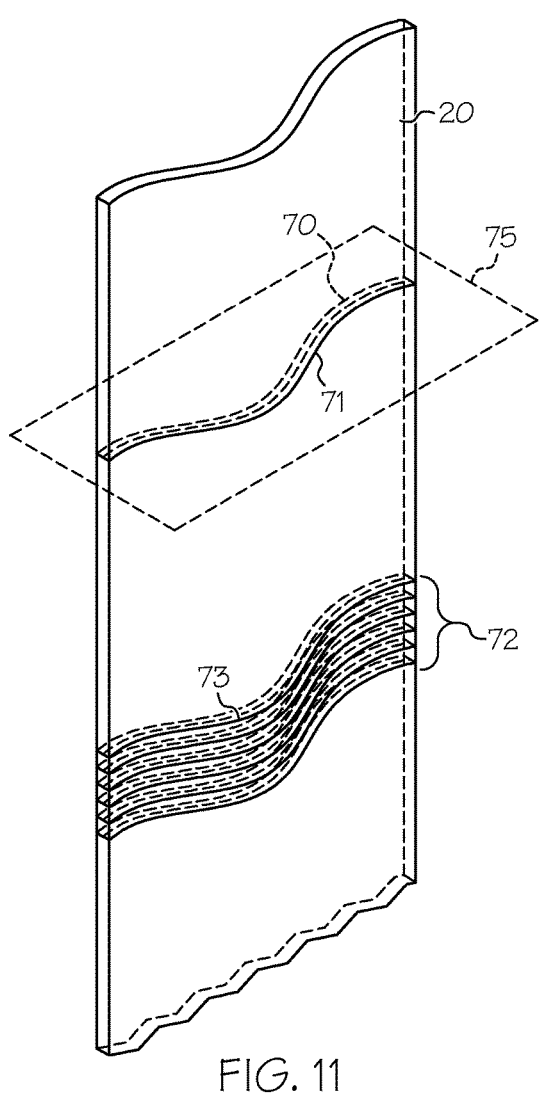
FIG. 11 illustrates example shapes of a specular reflective surface that can be determined from the method.

As shown in FIG. 11, in one example, the shape can approximate a cross-profile 70 of the specular reflective surface 20. A cross-profile 70 can be, for instance, a cross-section of the specular reflective surface at a plane 75, wherein the plane 75 intersects the specular reflective surface 20. In another example, where an object with a specular reflective surface is thin, having a thickness substantially less than its length and width, a cross-profile 70 can be approximated as a line or curve 71 lying in a plane 75, wherein the plane 75 intersects the specular reflective surface 20. In still another example, the method can further comprise the step of determining a plurality of shapes 72 of the specular reflective surface 20. For instance, each shape 73 of a plurality of shapes 72 can approximate a cross-profile 70 or curve 71 of the specular reflective surface 20.

Figure 12:
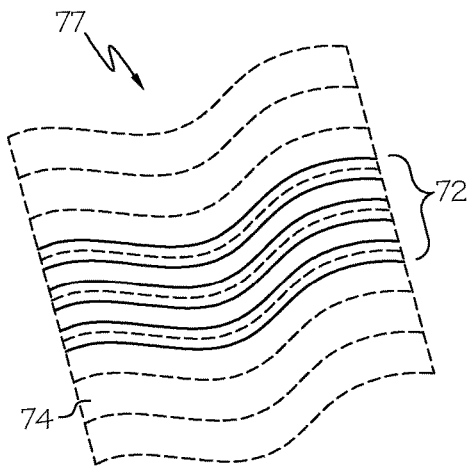
FIG. 12 illustrates other example shapes of a specular reflective surface that can be determined from the method.

In still another example, shown in FIG. 12, the method can further comprise the step of approximating a surface profile 74 of the specular reflective surface 20 based on a plurality of shapes 72. The surface profile 74 can be determined, for example, by spatially ordering and arranging the plurality of shapes 72 based on a relation thereamong. In one example, a plurality of shapes 72 can be digitally assembled to create a rendered image which can approximate an entire surface profile 77 of the specular reflective surface 20. For instance, where the specular reflective surface comprises a major surface of a sheet of material, the shape can approximate or simulate the actual shape of a portion of or the entire sheet of material.

Figure 13:
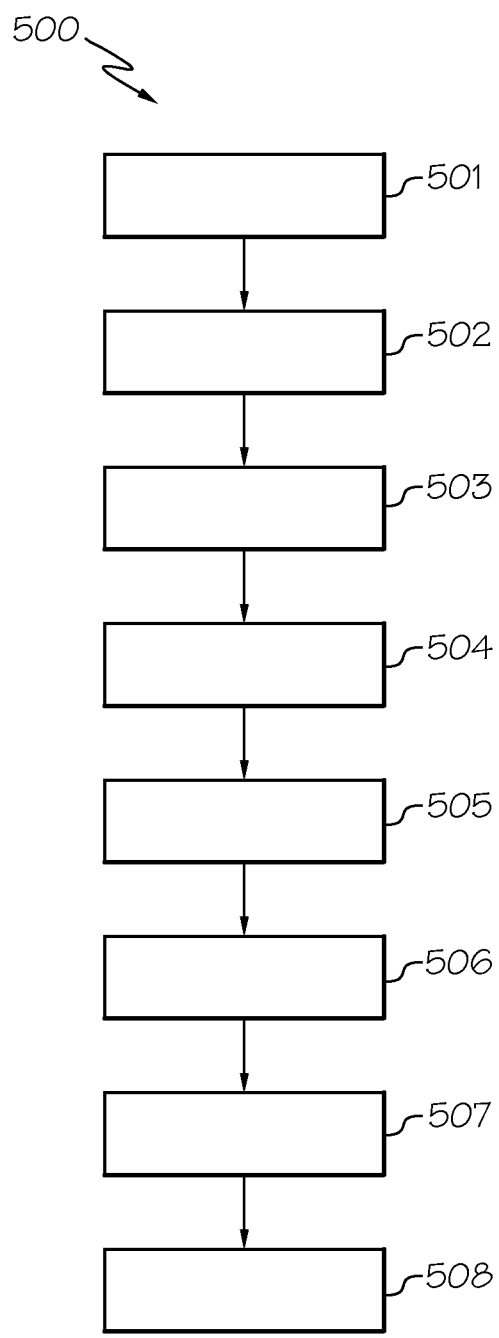
FIG. 13 illustrates an example flow chart of the method steps.

Any of the method steps can be performed at any of a same or different temporal frequency. For example, as shown in FIG. 13, any of the method steps 500, including obtaining calibration data 501, obtaining target data 502, defining a target line from the target data 503, capturing a reflected image 504, obtaining reflected data 505, defining a reflected line 506, determining a correspondence 507, and using the correspondence and calibration data to determine a shape of the specular reflective surface 508 can be performed at any of a same or different temporal frequency. In one example, any step can be performed at a rate of at least once per second. In another example, any step can be repeated at a rate such that the period of the temporal frequency approaches zero. For instance, any step can be performed at a rate that is substantially continuous in time. In still other examples, any step can be performed at a rate defined by any number of variables. Still further, any step can be performed once. In one example, one or more of the steps can be performed once, while others of the steps can be performed more than once.

Various computer, numerical, mathematical, linear, non-linear, scientific, digital, electronic, or other techniques can be used for any of the method steps 500, shown in FIG. 13, including obtaining calibration data 501, obtaining target data 502, defining a target line from the target data 503, capturing a reflected image 504, obtaining reflected data 505, defining a reflected line 506, determining a correspondence 507, and using the correspondence and calibration data to determine a shape of the specular reflective surface 508. Still further, any configuration, calculation, manipulation, or computation can be performed either together or alone and for any of the method steps provided herein.

For example, image analysis can be used, wherein an image, captured or otherwise obtained, can be analyzed and data contained therein can be extracted therefrom. In another example, a region of interest can be defined, wherein the region of interest can represent a particular region of the target structure, of the specular reflective surface, and/or of the reflected image of the target structure in the specular reflective surface. The region of interest can be defined by a user and coded directly or indirectly into a computer or can be automatically determined using a software routine or other procedure. In still another example, a derivative convolution can be used to highlight a change in direction perpendicular to the nominal feature of the target structure. The derivative convolution can, for example, show the rate of change of data point values between data points. In still another example, a rough proximity of the target line representing the target data as well as the reflected line representing the reflected data can be located using the derivative convolution. This process finds, for example, the point of maximum absolute value, representing the greatest change with respect to data point values perpendicular to the feature of the target structure. In still another example, data points may be filtered such that points which deviate too far from the general direction or directional trend of the feature of the target structure are eliminated and deemed outliers. In still another example, sub-pixel interpolation may be used to determine the data point with the greatest maximum absolute value of derivative. From this, using at least two points on each side of this data point, a polynomial can be fit to the data points and an actual peak location can be determined. This interpolation can be performed for each data point obtained, wherein a data point can relate, for example, to a feature of the target structure or its corresponding reflection in the specular reflective surface. In still another example, an integration methodology can be used, wherein an integration point can be defined. The integration point can be used to establish a starting point for integration over the specular reflective surface as multiple shapes of the specular reflective surface could produce the same reflection. In still another example, an initial condition for a differential equation recovery method can be defined. In still another example, three-dimensional point processing can be used to transform three-dimensional coordinates corresponding to data points of the calibration data, target data, or reflected data into two-dimensional data points which can define a location of the target structure and its corresponding reflection. In another example, data filtering can be performed wherein data points of the calibration data, target data, or reflected data are processed to remove any outliers. In one example, this filtering process involves fitting a polynomial line to the data points which, for example, can relate to the feature of the target structure and/or its corresponding reflection in the specular reflective surface. In a further example, any data points falling outside a defined distance from the fitted line are identified as outliers. The outliers may be either removed from the data set or retained by the data set. In still another example, the process of fitting a line, identifying outliers, and removing or retaining the outliers from the data set can be repeated any number of times with the same or different polynomial fit and/or with the same or different outlier rejection limits.

Figure 14:
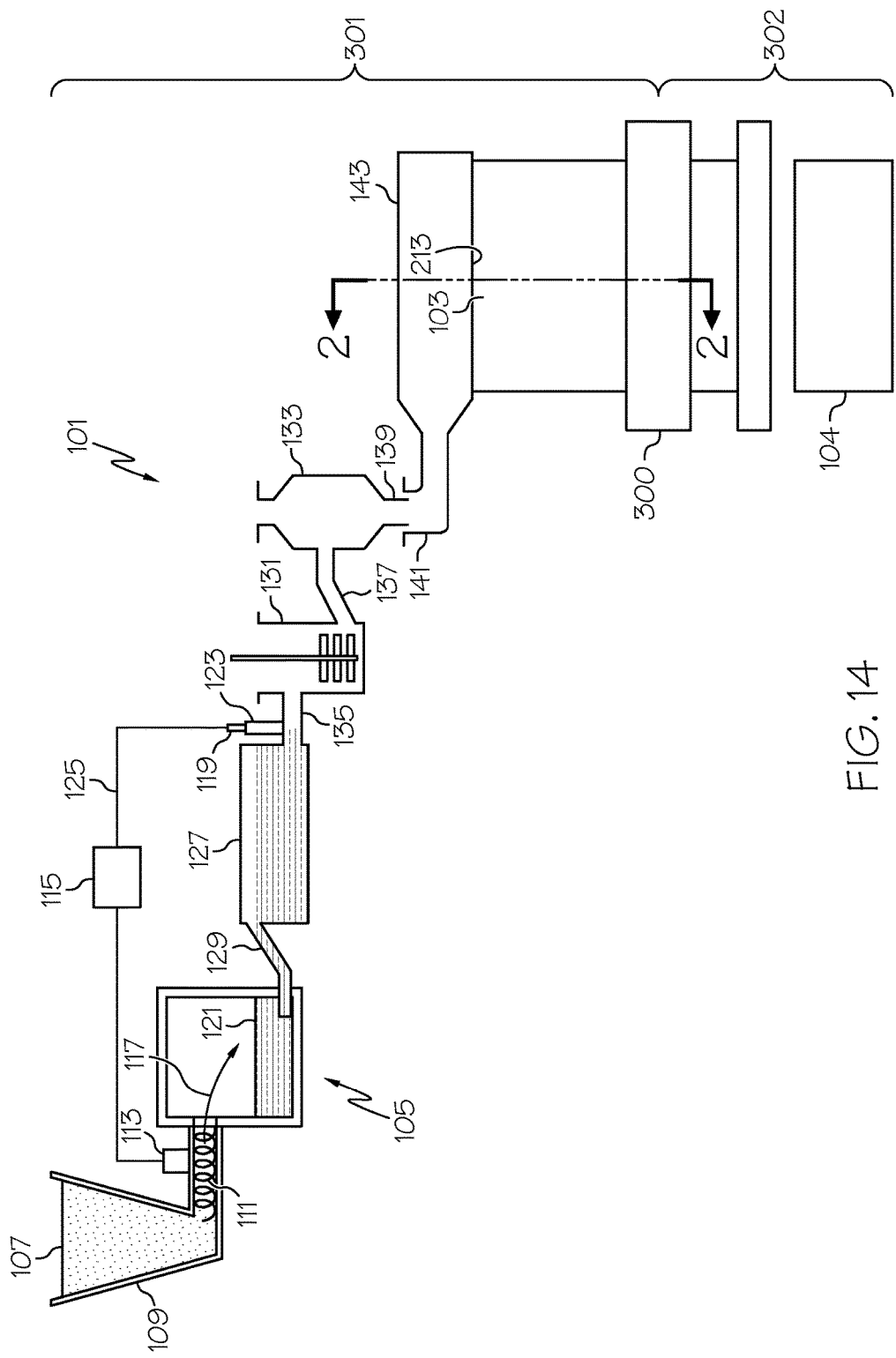
FIG. 14 is a schematic view of an example apparatus for producing glass ribbon.

Further aspects of the disclosure include methods for determining a shape of a glass ribbon 103 drawn from a quantity of molten glass 121, as shown in FIG. 14. Once produced, the glass ribbon 103 may be separated into glass sheets 104 which may be used in a wide variety of applications. For instance, glass sheets 104 produced from the glass ribbon 103 may, for example, be used in display applications. In particular examples, the glass sheets 104 may be used to produce liquid crystal displays (LCDs), electrophoretic displays (EPD), organic light emitting diode displays (OLEDs), plasma display panels (PDPs), or other display devices.

Glass ribbons may be fabricated by a variety of apparatus for producing glass ribbon in accordance with the disclosure such as slot draw, float, down-draw, fusion down-draw, or up-draw. Each apparatus can include a melting vessel configured to melt a batch of material into a quantity of molten glass. Each apparatus further includes at least a first conditioning station positioned downstream from the melting vessel and a second conditioning station positioned downstream from the first conditioning station.

FIG. 14 illustrates a schematic view of just one example apparatus for producing glass ribbon according to the disclosure, wherein the apparatus comprises a fusion draw apparatus 101 for fusion drawing a glass ribbon 103 for subsequent processing into glass sheets 104. The fusion draw apparatus 101 can include a melting vessel 105 configured to receive batch material 107 from a storage bin 109. The batch material 107 can be introduced by a batch delivery device 111 powered by a motor 113. An optional controller 115 can be configured to activate the motor 113 to introduce a desired amount of batch material 107 into the melting vessel 105, as indicated by arrow 117. A glass metal probe 119 can be used to measure a glass melt 121 level within a standpipe 123 and communicate the measured information to the controller 115 by way of a communication line 125.

The fusion draw apparatus 101 can also include a first conditioning station such as a fining vessel 127 (e.g., a fining tube), located downstream from the melting vessel 105 and coupled to the melting vessel 105 by way of a first connecting conduit 129. In some examples, glass melt may be gravity fed from the melting vessel 105 to the fining vessel 127 by way of the first connecting conduit 129. For instance, gravity may act to drive the glass melt to pass through an interior pathway of the first connecting conduit 129 from the melting vessel 105 to the fining vessel 127. Within the fining vessel 127, bubbles may be removed from the glass melt by various techniques.

The fusion draw apparatus can further include a second conditioning station such as a mixing vessel 131 (e.g., a stir chamber) that may be located downstream from the fining vessel 127. The mixing vessel 131 can be used to provide a homogenous glass melt composition, thereby reducing or eliminating cords of inhomogeneity that may otherwise exist within the fined glass melt exiting the fining vessel. As shown, the fining vessel 127 may be coupled to the mixing vessel 131 by way of a second connecting conduit 135. In some examples, glass melt may be gravity fed from the fining vessel 127 to the mixing vessel 131 by way of the second connecting conduit 135. For instance, gravity may act to drive the glass melt to pass through an interior pathway of the second connecting conduit 135 from the fining vessel 127 to the mixing vessel 131.

The fusion draw apparatus can further include another conditioning station such as a delivery vessel 133 (e.g., a bowl) that may be located downstream from the mixing vessel 131. The delivery vessel 133 may condition the glass to be fed into a forming device. For instance, the delivery vessel 133 can act as an accumulator and/or flow controller to adjust and provide a consistent flow of glass melt to the forming vessel. As shown, the mixing vessel 131 may be coupled to the delivery vessel 133 by way of a third connecting conduit 137. In some examples, glass melt may be gravity fed from the mixing vessel 131 to the delivery vessel 133 by way of the third connecting conduit 137. For instance, gravity may act to drive the glass melt to pass through an interior pathway of the third connecting conduit 137 from the mixing vessel 131 to the delivery vessel 133.

As further illustrated, a downcomer 139 can be positioned to deliver glass melt 121 from the delivery vessel 133 to an inlet 141 of a forming vessel 143. As shown, the melting vessel 105, fining vessel 127, the mixing vessel 131, delivery vessel 133, and forming vessel 143 are examples of glass melt conditioning stations that may be located in series along the fusion draw apparatus 101.

The melting vessel 105 is typically made from a refractory material, such as refractory (e.g. ceramic) brick. The fusion draw apparatus 101 may further include components that are typically made from platinum or platinum-containing metals such as platinum-rhodium, platinum-iridium and combinations thereof, but which may also comprise such refractory metals such as molybdenum, palladium, rhenium, tantalum, titanium, tungsten, ruthenium, osmium, zirconium, and alloys thereof and/or zirconium dioxide. The platinum-containing components can include one or more of the first connecting conduit 129, the fining vessel 127 (e.g., finer tube), the second connecting conduit 135, the standpipe 123, the mixing vessel 131 (e.g., a stir chamber), the third connecting conduit 137, the delivery vessel 133 (e.g., a bowl), the downcomer 139 and the inlet 141. The forming vessel 143 is also made from a refractory material and is designed to form the glass ribbon 103.

Figure 15:
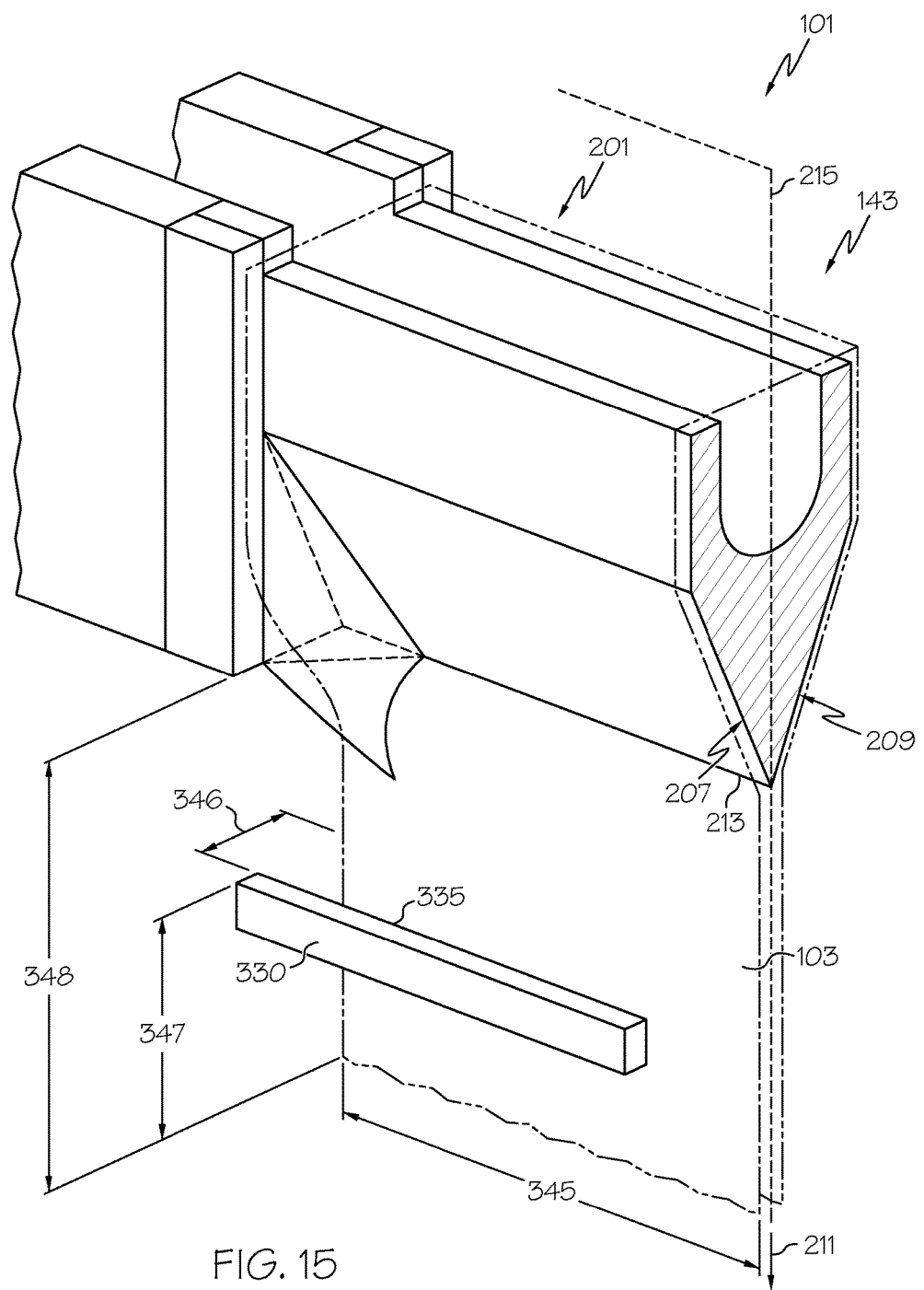
FIG. 15 is an enlarged partial perspective cross-sectional view of the apparatus along line 2-2 of FIG. 14 illustrating an example method wherein a feature of the target structure is substantially parallel to the glass ribbon.

FIG. 15 is a cross-sectional perspective view of the fusion draw apparatus 101 along line 2-2 of FIG. 14. As shown, the forming vessel 143 includes a forming wedge 201 comprising a pair of downwardly inclined forming surface portions 207, 209 extending between opposed ends of the forming wedge 201. The pair of downwardly inclined forming surface portions 207, 209 converge along a draw direction 211 to form a root 213. A draw plane 215 extends through the root 213 wherein the glass ribbon 103 may be drawn in the draw direction 211, for example in a downstream direction, along the draw plane 215. As shown, the draw plane 215 can bisect the root 213 although the draw plane 215 may extend at other orientations with respect to the root 213.

As shown in FIG. 14, the fusion draw apparatus 101 can include a system 300 to perform a method for determining a shape of a glass ribbon 103 drawn from a quantity of molten glass 121. The method can also be implemented to determine a shape of other objects with specular reflective characteristics, including optical fibers and other glass elements. Methods for determining a shape of a glass ribbon 103 drawn from a quantity of molten glass 121 will now be discussed. In one example, the glass ribbon 103 can be continuously moving in a draw direction 211. In another example, the shape can be used to control up-stream parameters 301 of a glass forming apparatus 101. In still another example, the shape can be used to control parameters of a down-stream process 302. In still another example, the shape can be used to control up-stream parameters 301 of a glass forming apparatus 101 and parameters of a down-stream process 302. In still another example, the shape can be used to determine an attribute of the glass ribbon, wherein a quality of the glass ribbon can be categorized based on the attribute.

For example, an attribute can include shape anomalies that can occur in the glass ribbon during the forming process, such as inclusions, scratches, or any other defects or irregularities. These anomalies can cause the glass ribbon to fall outside required specification characteristics or parameters wherein the glass ribbon or glass sheet may be rejected or identified for alternate uses. In another example, an attribute can be signatory of motion of the glass ribbon or of a change in shape or composition of the glass ribbon. By monitoring these attributes at various locations of the glass ribbon as well as at various times throughout the forming and/or processing process, one can control the forming and/or processing process and adjust or tune various glass forming and/or processing parameters. The attributes can be monitored periodically, repeatedly, or continuously, for example, and can be used to produce various output information, such as plots, graphs, charts, databases, or numerical data. In another example, an attribute can be associated with a particular glass sheet cut from the glass ribbon. That particular glass sheet can thereafter be discarded if its characteristics fall outside required specifications, further processed if needed, or identified based on its attribute for use in a specific application or distribution to a specific location. In still another example, an attribute can be used to determine those operating conditions which correspond to stable production, wherein the quality of the glass ribbon and/or the quality of the glass sheet are of a desirable quality or characteristic. In still another example, an attribute can be used to determine those operating conditions which correspond to undesirable production, wherein the quality of the glass ribbon and/or the quality of the glass sheet differ from those of a glass ribbon or a glass sheet exhibiting a desirable quality or characteristic. In still another example, an attribute can be used to notify a computer or a user when certain components, systems, or features of the glass forming apparatus are functioning properly or improperly. For example, based on a particular attribute of the glass ribbon, determined from its shape as calculated by the method disclosed herein, one could determine instances wherein certain elements of the system require replacement or repair, or instances where the various inputs for producing the molten glass could be adjusted to, for example, improve the quality of the glass ribbon and/or the glass sheet. Still further, a correlation among attributes can be determined. Such a correlation can be determined over a period of time and can include any of a number of various parameters involving the glass forming process, the glass ribbon, and/or the glass sheets as determined from the method or as provided from other controls. In still another example, the shape of the glass ribbon and/or glass sheet can be used to understand variations in glass forming, properties of the glass ribbon, and characteristics of glass sheets. The shape can be monitored and/or analyzed, for example, to improve the quality, efficiency, or any other features, parameters, or aspects associated with the methods described herein.

The method includes the step of obtaining calibration data. As noted, the calibration data can be obtained in a variety of manners, including directly or indirectly coding data into a computer, using a detection device to observe data, using a sensor to measure data, or capturing an image containing data from which the calibration data can be extracted. Examples of calibration data include coordinates or other information representing a characteristic or characteristics of any of the systems, components, or structures used in or by the method. For example, calibration data can include a spatial location of components of the system, such as the spatial location of a camera, a lens, or a focal point, information about the glass ribbon, the target structure and its associated features, or any other parameters, initial conditions, or data associated therewith. In another example, the calibration data can include reference points or coordinates which can be used to determine and define locations or relationships between various system components, structures, and variables. The calibration data can, for instance, be transformed, via a transformation matrix or other mathematical calculation, from three-dimensional coordinates in real space into two-dimensional coordinates. In still a further example, calibration data can be manipulated, combined, analyzed, or processed for further analysis, manipulation and/or calculations to be performed thereon.

The method further includes the step of obtaining target data about a target structure. As noted, the target data can be obtained in a variety of manners, including directly or indirectly coding data into a computer, using a detection device to observe data, using a sensor to measure data, or capturing an image containing data from which the target data can be extracted. Examples of target data include coordinates representing a spatial location or other reference characteristics relating to the target structure and/or its associated features, as well as any other information involving the target structure. For instance, the target data can include reference points which can be used to define and determine any number of a characteristic or relationship between various system components, structures, and variables. Still further, these reference points can be transformed, via a transformation matrix or other mathematical calculation, from three-dimensional coordinates in real space to two-dimensional coordinates. In still a further example, target data can be manipulated, combined, analyzed, or processed for further analysis, manipulation and/or calculations to be performed thereon. In one example, the target structure can be an existing structure within the glass forming apparatus 101 which, in addition to serving as a target structure, may serve other functions with respect to glass forming or processing. In another example, the target structure can be a dedicated structure introduced into the glass forming apparatus 101 for the sole purpose of functioning as a target structure in the method provided herein.

As shown in FIG. 15, the glass ribbon 103 can extend along a plane 215 and the feature 335 of the target structure 330 can be substantially parallel to the plane 215. In another example, shown in FIG. 16, the glass ribbon 103 can extend along a plane 215 and the feature 336 of the target structure 331 can be substantially perpendicular to the plane 215. A target structure 330, 331 can comprise any of a one or a plurality of geometries, shapes, structures, or sizes, including any of a plurality of features or characteristics associated therewith. The target structure can be constructed from any a variety of materials for use in various environments. For instance, in a glass forming apparatus 101, the target structure may be constructed from a material suitable to withstand high temperature environments. In further examples, the target structure can be independently lighted or dependently lighted by a light source. For instance, a target structure 330, 331 can be located within the fusion draw apparatus 101, wherein a window or other aperture can be included to provide a viewport for a light source to illuminate the target structure. The window or other aperture can be an existing window or aperture located in the fusion draw apparatus or can be a dedicated window or aperture included for the sole purpose of providing a viewport for a light source to illuminate the target structure. In still further examples, the target structure can be dynamic in that, for example, the target structure can include features or characteristics which can be changed, manipulated, or controlled either automatically or manually at any instance in time.

In one example, shown in FIG. 15, where the feature 335 of the target structure 330 is substantially parallel to the glass ribbon 103, the feature 335 of the target structure 330 can extend substantially parallel to the glass ribbon along a width 345 of the glass ribbon 103 and at a distance 346 from the glass ribbon 103. The substantially parallel feature 335 of the target structure 330 can also be located at an elevation 347 along a height 348 of the glass ribbon 103.

Figure 16:
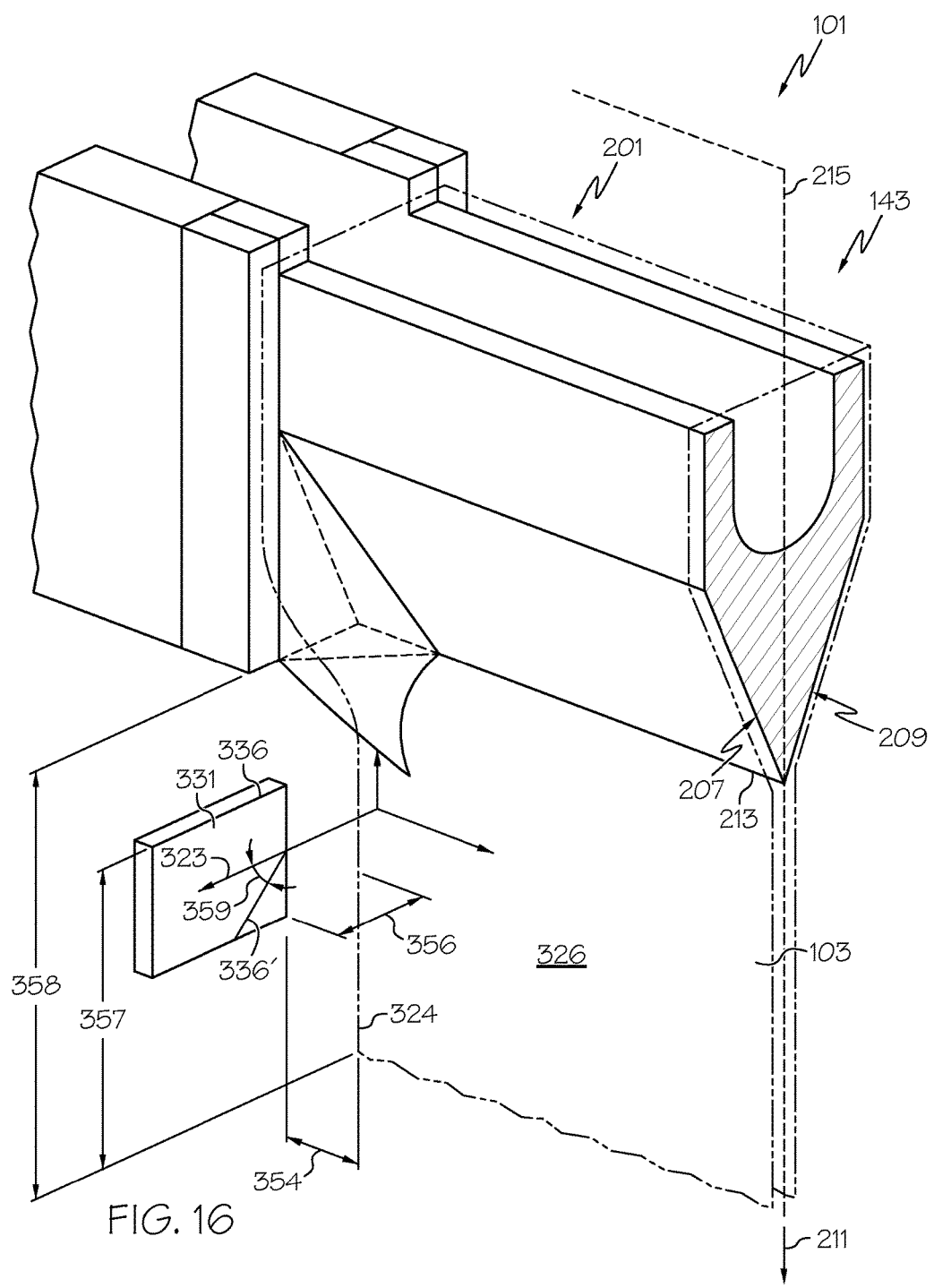
FIG. 16 is an enlarged partial perspective cross-sectional view of the apparatus along line 2-2 of FIG. 14 illustrating an example method wherein a feature of the target structure is substantially perpendicular to the glass ribbon.

In another example, shown in FIG. 16, where the feature 336 of the target structure 331 is substantially perpendicular to the glass ribbon 103, the feature 336 of the target structure 331 can extend substantially perpendicular to the glass ribbon 103 at a distance 354 from an edge 324 of the glass ribbon and at a distance 356 from a face 326 of the glass ribbon 103. The substantially perpendicular feature 336 of the target structure 330 can also be located at an elevation 357 along a height 358 of the glass ribbon 103. In still a further example, a substantially perpendicular feature 336' of the target structure 331 can be at an angle 359 relative to a surface normal 323 of the glass ribbon 103.

Figure 17:
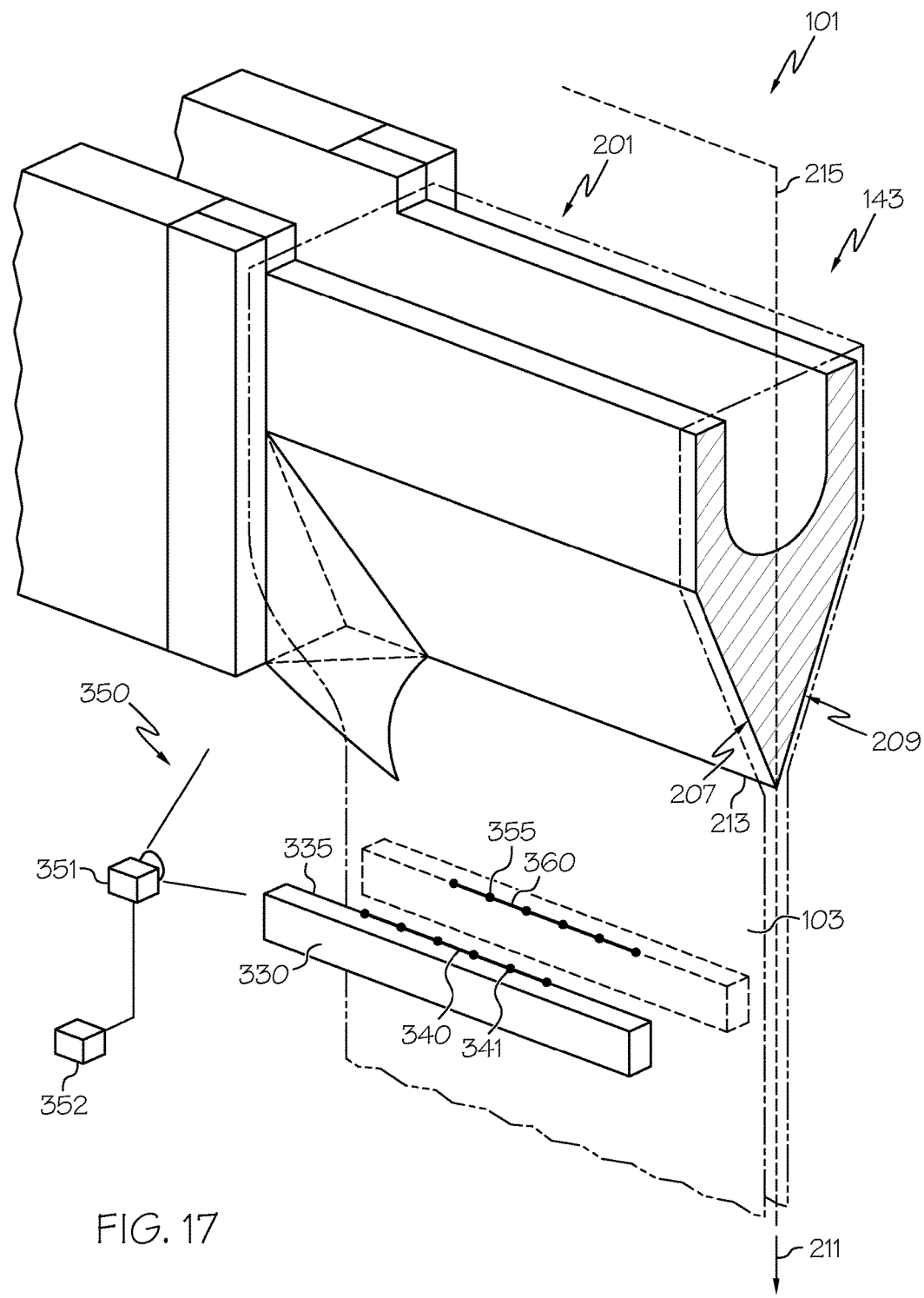
FIG. 17 illustrates an example method including the steps of obtaining target data about a target structure, defining a target line from the target data, capturing a reflected image of the target structure in the glass ribbon, obtaining reflected data from the reflected image, and defining a reflected line from the reflected data.

As shown in FIG. 17, the method further includes the step of defining a target line 340 from the target data 341, wherein the target line 340 represents a feature 335 of the target structure 330. The feature 335 of the target structure 330 can be any of a feature or characteristic of the target structure 330. In one example, the feature 335 of the target structure can be an edge of the target structure 330. For instance, where the target structure 330 is of a geometric shape, as shown in FIG. 17, the feature 335 of the target structure can be an edge of the geometric shape. The feature 335 of the target structure 330 can exist at any of a location on the target structure and can extend at any angle and/or in any direction relative to the glass ribbon 103.

As noted, known edge finding techniques, for example, can be used to mathematically define data points corresponding to an edge or other features or characteristics of the target structure. Various mathematical techniques are known and may be used to define a target line from the target data. In one example, this step can comprise performing a regression analysis with respect to a plurality of data points from the target data, wherein the plurality of data points can be related to the feature of the target structure. From these data points, a target line can be determined using any of a regression analysis approach or other mathematical technique.

As shown in FIG. 17, the method further includes the step of capturing a reflected image 350 of the target structure 330 in the glass ribbon 103. As noted, the reflected image 350 can be captured using an image capture device 351, including a camera or other image or video recording device. Once captured, the reflected image 350 can be analyzed or transferred to a computer 352 by which data contained within the image can be extracted, processed, and/or analyzed.

Figure 18:
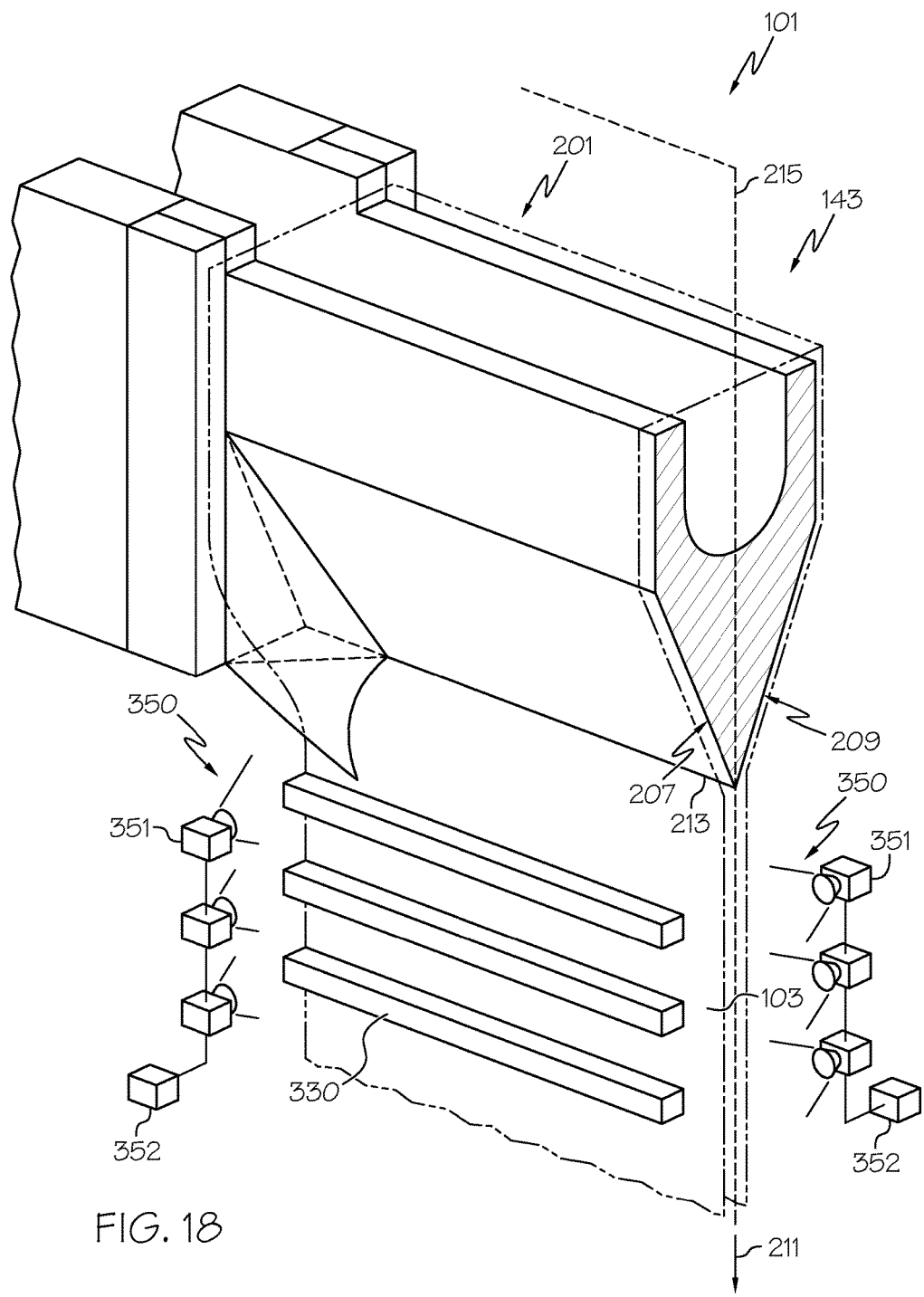
FIG. 18 illustrates an example method including one or more target structures.

As shown in FIG. 18, one or more image capture devices 351 may be used to capture one or more reflected images 350 of one or more target structures 330. In a further example, shown in FIG. 18, one or more reflected images 350 may be captured at various locations of the glass ribbon 103. In still a further example, the reflected images 350 may include any or all of the reflection of the target structure as well as any or all of the reflection of the feature of the target structure. For example, an image capture device 351, such as a camera, may be located at a side of the glass ribbon 103 such that the image capture device 351 captures a reflected image 350 of the target structure over approximately half of the width of the glass ribbon 103. In another example, a second image capture device 351, such as a second camera, may be located at an opposite side of the glass ribbon at a same or similar vertical elevation with respect to the first image capture device such that the second image capture device also captures a reflected image of the target structure over approximately half of the width of the glass ribbon. The first image capture device and second image capture device can, for example, capture a reflected image of the target structure over the entire width of the glass ribbon. In still a further example, the first and second image capture devices can be configured to capture a reflected image including an overlapping region of the glass ribbon. The overlapping region can, for example, be used for calibration or other configuration calculations where multiple data points corresponding to the same spatial location of the glass ribbon are advantageous.

In still a further example, the properties or aspects of the reflected image 350 can be captured based on a location or angle of the image capture device or image capture devices in relation to the glass ribbon 103. In still a further example, obstructions or limitations may prevent placement of the image capture devices for ideal capture of the reflected image. The image capture device 351 may, for example, be mounted on an adjustable mechanism such that the location and/or angle of the image capture device can be adjusted or altered manually or automatically to accommodate such obstructions or limitations and such that the image capture device may be removed to provide access to the fusion draw apparatus 101 for inspection, cleaning, or repair thereof. In still a further example, the same or different image capture device may be arranged to capture an image of the glass ribbon 103, the target structure 330, 331 and any other components used in or by the glass forming apparatus 101 or processing steps. In still a further example, the image capture device 351 can be arranged to view the glass ribbon 103, target structure 330, 331, or other components through the aforementioned existing or dedicated viewport windows in the fusion draw apparatus 101. Still further, the image capture device can be located in proximity to a light source wherein the light from the light source can illuminate the target structure and the glass ribbon to improve a quality of image capture as well as to provide light or illumination to enhance the reflective characteristics of the glass ribbon 103.

As also shown in FIG. 17, the method further includes the step of obtaining reflected data 355 from the reflected image 350. As noted, the reflected data 355 can be obtained in a variety of manners, including extracting, processing, and/or analyzing the reflected image 350 to obtain the reflected data 355. Examples of reflected data 355 include coordinates representing a spatial location or other reference characteristics relating to the reflected image 350 of the target structure and/or its associated features, as well as any other information involving the reflected image 350. For instance, the reflected data 355 can include reference points which can be used to define and determine any number of a relationship or characteristic between the reflected image 350 of the target structure and/or its associated features and various system components, structures, and variables. Still further, these reference points can be transformed, via a transformation matrix or other mathematical calculation, from three-dimensional coordinates in real space to two-dimensional coordinates. In still a further example, reflected data 355 can be manipulated, combined, analyzed, or processed for further analysis, manipulation and/or calculations to be performed thereon.

As also shown in FIG. 17, the method further includes the step of defining a reflected line 360 from the reflected data 355, wherein the reflected line 360 represents a reflection of the feature 335 of the target structure 330. As noted, the feature 335 of the target structure 330 can be any of a feature or characteristic of the target structure 330. As such, the reflection of the feature 335 of the target structure 330 can be any of a corresponding reflection of a feature or characteristic of the target structure 330. In one example, as noted, the feature 335 of the target structure 330 can be an edge of the target structure 330. Thus, the reflection of the feature 335 of the target structure 330 can be a corresponding reflection of an edge of the target structure represented by a reflected line 360 defined from the reflected data 355 extracted from the reflected image 350. For instance, where the target structure is of a geometric shape, the feature of the target structure can be an edge of the geometric shape and the reflection of the feature can be a corresponding reflection of an edge of the geometric shape.

Known edge finding techniques, for example, can be used to mathematically define data points corresponding to a reflection of an edge or other features or characteristics of the target structure. Various mathematical techniques are known and may be used to define a reflected line from the reflected data. In one example, this step can comprise performing a regression analysis with respect to a plurality of data points from the reflected data, wherein the plurality of data points can be related to the reflection of the feature of the target structure. From these data points, a reflected line can be determined using any of a regression analysis approach or other mathematical technique.

The method further includes the step of determining a correspondence between the target line 340 and the reflected line 360. As noted, a correspondence can include, for example, a comparison, a correlation, or any other of a relationship or relationships between all or part of the target line 340 and all or part of the reflected line 360. For example, the target line 340 can be analyzed. In another example, the reflected line 360 can be analyzed. In still another example the target line 340 and the reflected line 360 can be analyzed. A correspondence can be determined by any of a variety of techniques, including a computerized or manual process, a mathematical calculation, or any other manner of computation. In one example, the correspondence can include a determination of a distortion of the reflected line 360 from the reflected data 355 in the reflected image 350 compared to the target line 340 from the target data 341 of the target structure 330.

The method further includes the step of using the correspondence and the calibration data to determine the shape of the glass ribbon 103. In an example, all or part of the correspondence can be used. In another example all or part of the calibration data can be used. In still another example, all or part of the correspondence can be used and all or part of the calibration data can be used. This step can comprise, for example, performing a shape recovery algorithm. A shape recovery algorithm can use any of the above data to determine a shape of the glass ribbon 103. For instance, a shape of the glass ribbon 103 can be determined by restoring, recovering, back-calculating, or otherwise deducing the contour or profile of the glass ribbon which would produce the captured reflected image 350 of the target structure 330 based on the correspondence and the calibration data.

As shown in FIG. 11, in one example, the shape can approximate a cross-profile 70 of the glass ribbon 103. A cross-profile 70 can be, for instance, a cross-section of the glass ribbon 103 at a plane 75, wherein the plane 75 intersects the glass ribbon 103. In another example, where the glass ribbon is thin, having a thickness substantially less than its length and width, a cross-profile 70 can be approximated as a line or curve 71 lying in a plane 75, wherein the plane 75 intersects the glass ribbon 103. For a glass ribbon 103, glass sheet 104, or other transparent material where a reflection of an object or target structure can occur on both surfaces of the material, a shape can be determined by considering the Fresnel reflection coefficient. In still another example, the method can further comprise the step of determining a plurality of shapes 72 of the glass ribbon 103. For instance, each shape 73 of a plurality of shapes 72 can approximate a cross-profile 70 or curve 71 of the glass ribbon 103.

In still another example, shown in FIG. 12, the method can further comprise the step of approximating a surface profile 74 of the glass ribbon 103 based on a plurality of shapes 72. The surface profile 74 can be determined, for example, by spatially ordering and arranging the plurality of shapes 72 based on a relation thereamong. In one example, a plurality of shapes 72 can be digitally assembled to create a rendered image which can approximate an entire surface profile 77 of the glass ribbon 103. For instance, the shape can approximate or simulate the actual shape of a portion of or the entire glass ribbon 103 and/or the actual shape of a portion of or the entire glass sheet 104 cut therefrom.

Any of the above steps can be performed at any of a same or different temporal frequency. For example, as shown in FIG. 13, any of the method steps 500, including obtaining calibration data 501, obtaining target data 502, defining a target line from the target data 503, capturing a reflected image 504, obtaining reflected data 505, defining a reflected line 506, determining a correspondence 507, and using the correspondence and calibration data to determine a shape of the specular reflective surface 508 can be performed at any of a same or different temporal frequency. In one example, any step can be performed at a rate of at least once per second. In another example, any step can be repeated at a rate such that the period of the temporal frequency approaches zero. For instance, any step can be performed at a rate that is substantially continuous in time. In still other examples, any step can be performed at a rate defined by any number of variables. In one example, any of the steps can be performed at a rate coinciding with once per glass sheet. In another example, any of the steps can be performed at a rate adjusted based on the size of the glass sheet, the quality of the glass sheets being produced or already produced, or any other factors which may contribute to or alter the glass forming apparatus and other processes. Still further, any step can be performed once. In one example, one or more of the steps can be performed once, while others of the steps can be performed more than once.

Various computer, numerical, mathematical, linear, non-linear, scientific, digital, electronic, or other techniques can be used for any of the steps of the method, including obtaining calibration data, obtaining target data, defining a target line from the target data, capturing a reflected image, obtaining reflected data, defining a reflected line, determining a correspondence, and using the correspondence and calibration data to determine a shape of the glass ribbon. Any configuration, calculation, manipulation, or computation can be performed either together or alone and for any of the method steps provided herein.

It will be apparent to those skilled in the art that various modifications and variations can be made without departing from the spirit and scope of the claimed invention.

What is claimed is:

1. A method for determining a shape of a substantially cylindrical specular reflective surface comprising the steps of:
    (I) obtaining calibration data;
    (II) obtaining target data about a target structure;
    (III) defining a target line from the target data, wherein the target line represents a feature of the target structure;
    (IV) capturing a reflected image of the target structure in the specular reflective surface;
    (V) obtaining reflected data from the reflected image;
    (VI) defining a reflected line from the reflected data, wherein the reflected line represents a reflection of the feature of the target structure;
    (VII) determining a correspondence between the target line and the reflected line; and
    (VIII) using the correspondence and the calibration data to determine the shape of the specular reflective surface.

2. The method of claim 1, wherein step (VIII) comprises performing a shape recovery algorithm.

3. The method of claim 1, wherein step (III) comprises performing a regression analysis with respect to a plurality of data points from the target data, wherein the plurality of data points is related to the feature of the target structure.

4. The method of claim 1, wherein step (VI) comprises performing a regression analysis with respect to a plurality of data points from the reflected data, wherein the plurality of data points is related to the reflection of the feature of the target structure.

5. The method of claim 1, wherein the feature of the target structure is an edge of the target structure.

6. The method of claim 1, wherein the specular reflective surface extends along a plane and the feature of the target structure is substantially parallel to the plane.

7. The method of claim 1, wherein the specular reflective surface extends along a plane and the feature of the target structure is substantially perpendicular to the plane.

8. The method of claim 1, wherein the specular reflective surface comprises a major surface of a sheet of material.

9. The method of claim 1, wherein the shape approximates a cross-profile of the specular reflective surface.

10. The method of claim 1, further comprising the step of determining a plurality of shapes of the specular reflective surface, wherein each shape approximates a cross-profile of the specular reflective surface.

11. The method of claim 10, further comprising the step of approximating a surface profile of the specular reflective surface based on the plurality of shapes.

12. A method for determining a shape of a glass ribbon drawn from a quantity of molten glass comprising the steps of:
    (I) obtaining calibration data;
    (II) obtaining target data about a target structure;
    (III) defining a target line from the target data, wherein the target line represents a feature of the target structure;
    (IV) capturing a reflected image of the target structure in the glass ribbon;
    (V) obtaining reflected data from the reflected image;
    (VI) defining a reflected line from the reflected data, wherein the reflected line represents a reflection of the feature of the target structure;
    (VII) determining a correspondence between the target line and the reflected line; and
    (VIII) using the correspondence and the calibration data to determine the shape of the glass ribbon.

13. The method of claim 12, wherein step (VIII) comprises performing a shape recovery algorithm.

14. The method of claim 12, wherein step (III) comprises performing a regression analysis with respect to a plurality of data points from the target data, wherein the plurality of data points is related to the feature of the target structure.

15. The method of claim 12, wherein step (VI) comprises performing a regression analysis with respect to a plurality of data points from the reflected data, wherein the plurality of data points is related to the reflection of the feature of the target structure.

16. The method of claim 12, wherein the glass ribbon is continuously moving in a draw direction.

17. The method of claim 12, wherein the shape is used to control up-stream parameters of a glass forming process.

18. The method of claim 12, wherein the shape is used to control parameters of a down-stream process.

19. The method of claim 12, wherein the shape is used to control up-stream parameters of a glass forming process and parameters of a down-stream process.

20. The method of claim 12, wherein the shape is used to determine an attribute of the glass ribbon, and wherein a quality of the glass ribbon is categorized based on the attribute.

* * * * *